United States Patent [19]

Heenan

[11] 4,183,589

[45] Jan. 15, 1980

[54] IMPROVEMENTS IN OR RELATING TO LOCKING DEVICES FOR ROTARY BEARINGS

[75] Inventor: Kenneth Heenan, Sheffield, England

[73] Assignee: National Research Development Corporation, London, England

[21] Appl. No.: 907,721

[22] Filed: May 19, 1978

[30] Foreign Application Priority Data

Jul. 1, 1977 [GB] United Kingdom ............... 27636/77

[51] Int. Cl.² .............................................. F16C 13/00
[52] U.S. Cl. ...................................... 308/1 A; 308/18; 308/191
[58] Field of Search ...................... 308/1 A, 8, 18, 183, 308/191, 188, 210, 202, 236, 173, 177; 188/69, 67, 166, 167, 1 R, 79.5 B

[56] References Cited

U.S. PATENT DOCUMENTS

| 2,873,006 | 2/1959 | Phillips | 188/79.5 B X |
| 3,452,349 | 6/1969 | Wood | 308/183 X |
| 4,015,882 | 4/1977 | Stenert | 308/1 A |
| 4,058,353 | 11/1977 | Frommlet et al. | 308/1 A |

*Primary Examiner*—Douglas C. Butler
*Attorney, Agent, or Firm*—Oblon, Fisher, Spivak, McClelland & Maier

[57] ABSTRACT

A device, especially for the bearings of idler rollers of underground coal conveyors in collieries, to lock the two halves of a bearing against further rotation when the bearing overheats. Overheating causes a fusible plug, mounted on one half of the bearing, to melt and release a catch member which engages with an abutment on the other half. The plug may be designed so that when it has once fused so as to lock the two halves, it still prevents them from resuming mutual rotation even if it solidifies again.

9 Claims, 3 Drawing Figures

IMPROVEMENTS IN OR RELATING TO LOCKING DEVICES FOR ROTARY BEARINGS

This invention relates to locking devices, especially devices that can be operated to lock a wheel or other rotary member against further rotation. It relates particularly to safety devices to lock a wheel or roller when its bearings overheat through failure, and one useful application of the invention is to the idler rollers of underground coal conveyors in collieries. Many dangerous fires have been caused by the bearings of such rollers overheating. Since the usual coal conveyor has many rollers, close monitoring of them all by colliery personnel or by instrumentation has proved either impractical or prohibitively expensive.

One known method of reducing the fire hazard when a roller bearing has overheated has been simply to lock the roller concerned. Once this is done heat will be generated by friction between the moving belt and the stationary roller barrel surface, but the temperatures reached are low enough to make ignition of coal dust unlikely and the performance of the whole conveyor, with its many rollers, is little impaired by the stopping of only one or two rollers.

The present invention relates to stopping rollers automatically when their bearings overheat. It is defined by the claims at the end of this specification and will now be described, by way of example, with reference to the accompanying drawings, in which:

Figure 1:
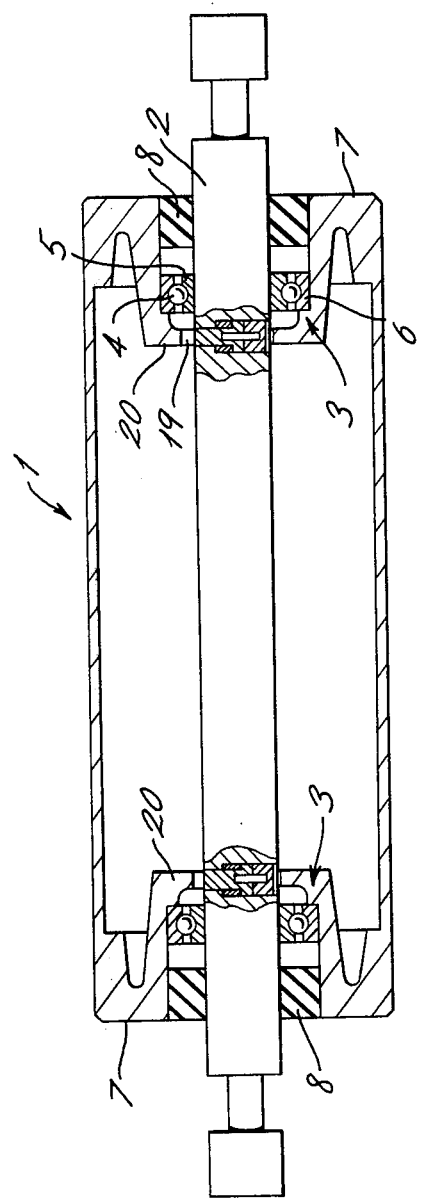
FIG. 1 is an axial section through a roller having two devices according to the invention.

FIG. 1 shows a driveless roller, such as is used to support belt conveyors in collieries. It comprises a barrel 1 supported from a fixed shaft 2 by bearings 3. The balls 4 of these bearings run between the bearing inner halves 5, mounted on shaft 2, and the outer halves 6 which are carried by the end wall structures 7 of barrel 1. Each bearing 3 is protected by a seal 8.

Figure 2:
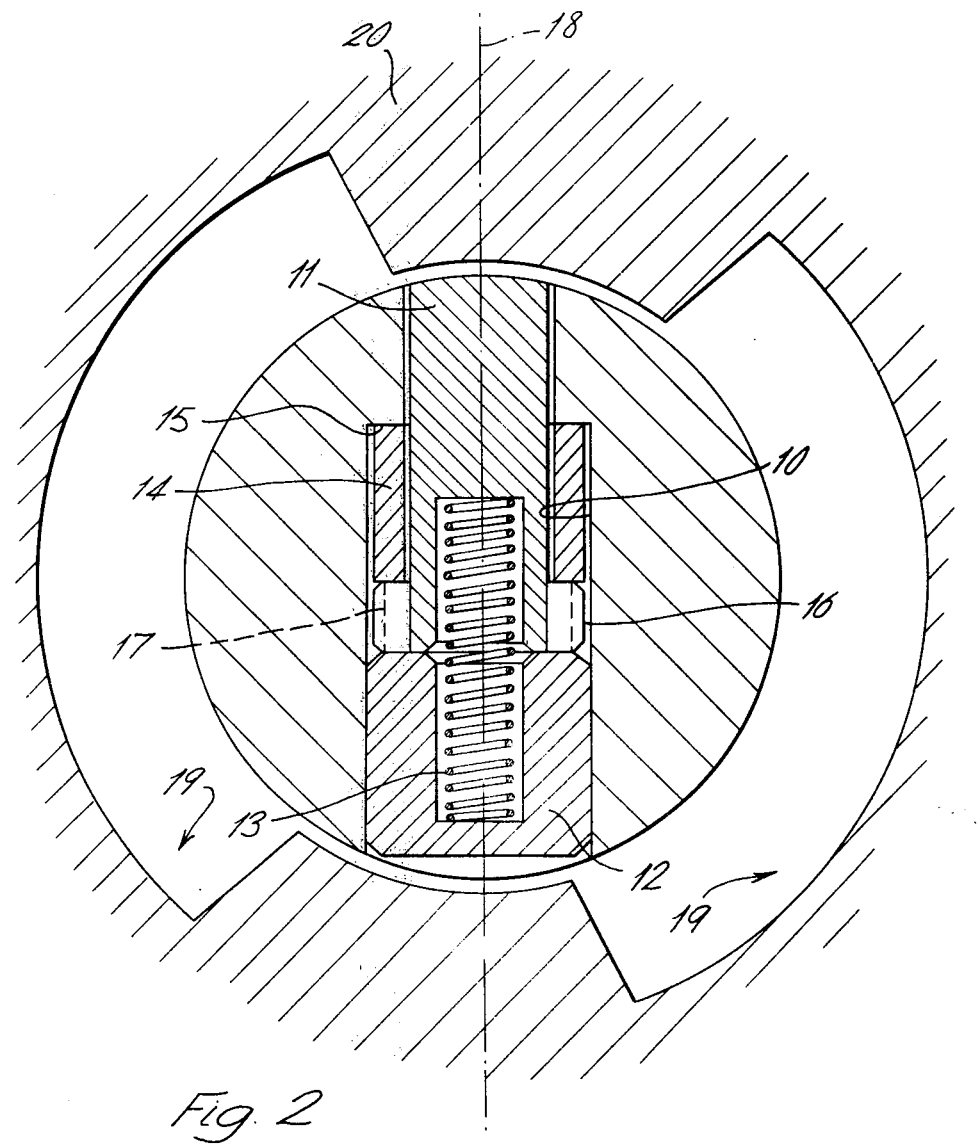
FIG. 2 is a cross section through one such device when ready to operate.
Figure 3:
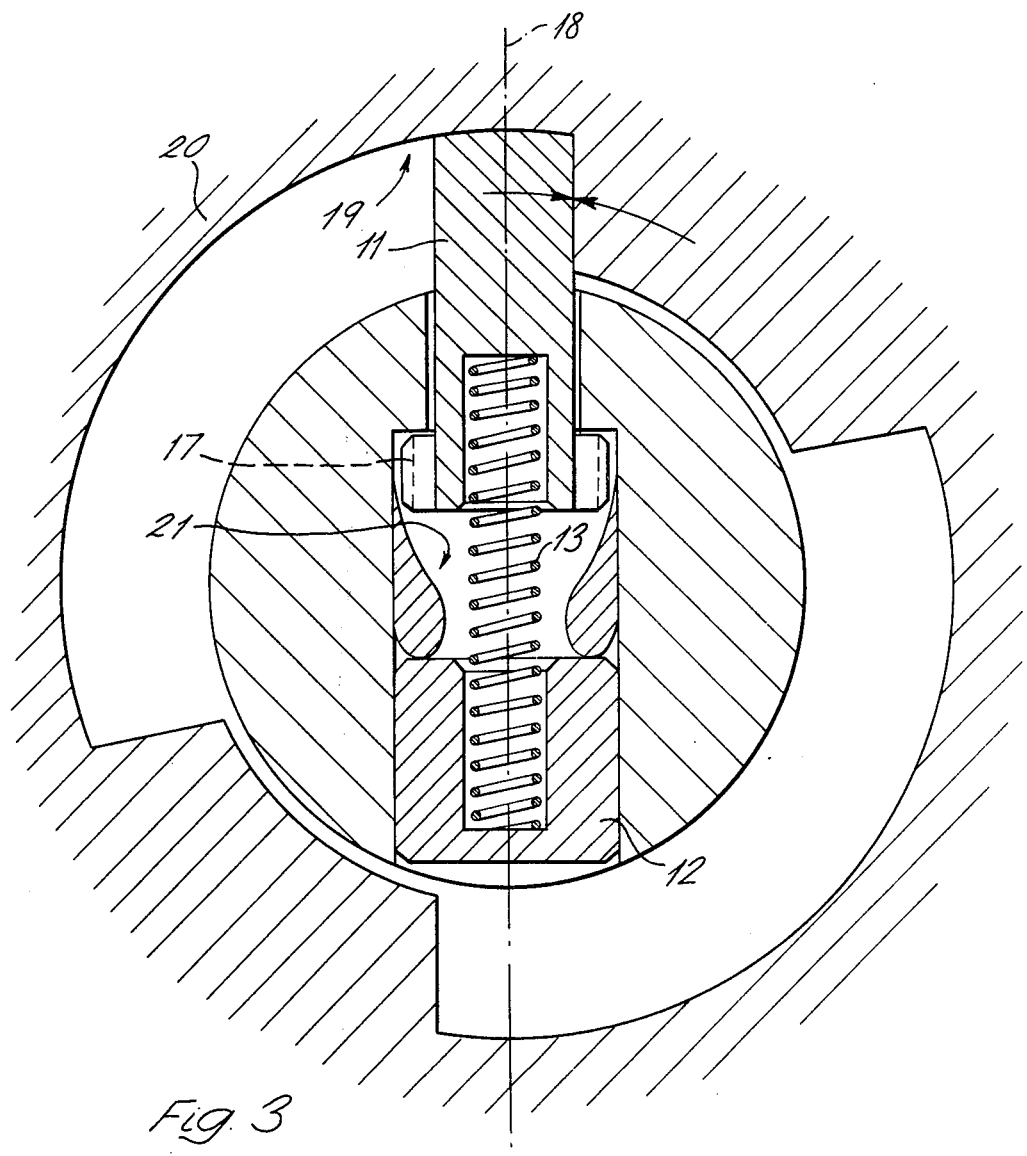
FIG. 3 is a cross section through the same device when it has operated to arrest rotation of the roller.

A locking device according to this invention is fitted close to each bearing, and is shown in greater detail in FIGS. 2 and 3. Each device comprises a stepped hole 10 formed diametrically through shaft 2, close to one of the bearings 3. A catch member or locking pin 11 is slidably mounted in the narrower end of hole 10, and a securing plug 12 locks the wider end and acts as a stop for one end of a spring 13, the other end of which bears against pin 11. Under normal conditions spring 13 is compressed between pin 11 and plug 12, and the pin is restrained from emerging from hole 10 by a fusible plug or bush 14, of low melting point alloy, which is interposed between the step 15 in hole 10 and an integral collar 16 on the inner end of pin 11. Slots 17, with their length lying parallel to the axis 18 of hole 10, are formed at intervals around the edge of collar 16.

FIG. 2 shows the device with pin 11 in its normal, retracted position. If the nearby bearing 3 overheats, heat is conducted through shaft 2 to bush 14, which melts and is then forced as a fluid under the action of spring 13 through slots 17. This allows the forward end of pin 11 to project from the shaft as shown in FIG. 3, and to engage the abutment provided by one of two recesses 19 formed in a collar 20 integral with barrel 1, thus halting the rotation of the barrel about the shaft.

Once this rotation is stopped, the bearing will cool and conduction of heat from the bearing to hole 10 along shaft 2 will cease. Melted bush 14 will therefore solidify in the region 21 in which it is shown in FIG. 3, thus preventing pin 11 from being forcibly pushed back again into its retracted position and so releasing the barrel 1 for further rotation.

It will be noted that a locking device is associated with each of the two bearings 3 of the rotary member, that is to say the roller, shown in the drawings. Where the rotary member has many bearings and it cannot be predicted which, if any, will fail first, it is important for safety to protect each bearing with a locking device separately. Where however it is known that certain bearings tend to fail preferentially there may of course be some argument for protecting these bearings only.

The invention of course includes converse arrangements in which an equivalent of the pin 11 is mounted on the barrel, when heat from a hot bearing will be conducted to it through the outer bearing half, and the corresponding recess is mounted on the shaft.

I claim:

1. An automatic locking device for a rotary bearing, comprising:
    a shaft and a surrounding roller supporting said rotary bearing between them;
    a retractable catch member mounted on one of said parts, close to said bearing;
    an abutment member mounted on the other of said parts, and
    a fusible plug contained within said retractable catch member, said fusible plug being so located within said bearing that overheating of said bearing causes said plug to melt and said members to engage and prevent further mutual rotation of said parts.

2. A device according to claim 1 in which said fusible plug is melted by conduction of heat from said bearing.

3. A device according to claim 1 in which said retractable catch member is mounted on said shaft.

4. A device according to claim 3 in which said abutment member is mounted upon the part of said bearing carried by said surrounding roller.

5. A device according to claim 3 in which said roller is supported from said shaft by a plurality of bearings, said device being located close to one of said plurality of bearings.

6. A device according to claim 1 in which said retractable catch member comprises resilient loading means which bias said catch member towards its position of engagement with said abutment member and in which in normal use said fusible plug bears against said resilient loading means to restrain them.

7. A device according to claim 1 in which said retractable catch member is mounted for travel in a direction radial relative to the axis of rotation of said bearing when moving from its retracted to its engaging position.

8. A device according to claim 1 in which said fusible plug is so arranged that if it solidifies again after fusing to allow said members to engage, it solidifies to a new shape that prevents said members from disengaging again.

9. Rotary mechanism including a device to automatically prevent rotation when said mechanism overheats, and comprising:
    two mutually rotatable parts, supporting a rotary bearing between them;
    a retractable catch member mounted on one of said parts close to said rotary bearing;

an abutment member mounted on the other of said parts, and a fusible plug contained within said retractable catch member, said fusible plug being so located that overheating of said bearing causes said plug to melt and said members to engage and prevent further rotation of said mutually rotatable parts.

* * * * *